United States Patent
Weber

(10) Patent No.: US 9,109,713 B2
(45) Date of Patent: Aug. 18, 2015

(54) CONTROL DEVICE AND USE THEREOF

(75) Inventor: Thomas Weber, Winterbach (DE)

(73) Assignee: Mahle International GmbH (DE)

( * ) Notice: Subject to any disclaimer, the term of this patent is extended or adjusted under 35 U.S.C. 154(b) by 468 days.

(21) Appl. No.: 13/510,558

(22) PCT Filed: Nov. 9, 2010

(86) PCT No.: PCT/EP2010/067103
§ 371 (c)(1),
(2), (4) Date: Aug. 17, 2012

(87) PCT Pub. No.: WO2011/061095
PCT Pub. Date: May 26, 2011

(65) Prior Publication Data
US 2012/0304951 A1    Dec. 6, 2012

(30) Foreign Application Priority Data

Nov. 18, 2009   (DE) .......................... 10 2009 053 829

(51) Int. Cl.
*F16K 31/04* (2006.01)
*F02B 37/18* (2006.01)

(52) U.S. Cl.
CPC ............. *F16K 31/047* (2013.01); *F02B 37/186* (2013.01); *F05B 2220/40* (2013.01); *F05B 2260/507* (2013.01); *Y02T 10/144* (2013.01)

(58) Field of Classification Search
CPC ......... F16K 31/18; F16K 31/20; F16K 31/04; F16K 31/0682; F16K 31/047; F16K 31/043; F02B 37/186; F05B 2260/507; F05B 2220/40
USPC ........ 251/77, 78, 129.11, 298, 299, 228, 229, 251/231, 249.5, 84, 86, 87; 74/54; 60/602; 123/568.21, 568.23, 568.24, 399, 400
See application file for complete search history.

(56) References Cited

U.S. PATENT DOCUMENTS 1,354,965 A * 10/1920 Gish ............................... 251/77
3,885,771 A *  5/1975 Baumann ....................... 251/298

(Continued)

FOREIGN PATENT DOCUMENTS

CN  201187584 Y  1/2009
DE    3907289 A1  9/1990

(Continued)

OTHER PUBLICATIONS

English abstract for DE-102007031429.

(Continued)

*Primary Examiner* — William McCalister
*Assistant Examiner* — Ian Paquette
(74) *Attorney, Agent, or Firm* — Fishman Stewart Yamaguchi PLLC

(57) ABSTRACT

A control device may include a control drive and a coupling unit coupled to a drive side of the control drive for performing bidirectional control motions and also be coupled to an output side of the control member to be bidirectionally actuated. The coupling unit may have a drive element on the drive side coupled to the control drive. The coupling unit may have an output element on the output side coupled to the control member and to the drive element via a joint for transferring tensile and compression forces in a longitudinal axis of the output element. The joint may be configured to allow pivot motions between the drive element and the output element about a transverse axis running in the joint transverse to the longitudinal axis. The joint may also be configured to allow linear motions parallel to the transverse axis.

20 Claims, 2 Drawing Sheets

(56) References Cited

U.S. PATENT DOCUMENTS

| | | | | |
|---|---|---|---|---|
| 4,742,989 A | * | 5/1988 | Akagi | 251/129.05 |
| 5,152,316 A | | 10/1992 | Dorr | |
| 5,937,835 A | * | 8/1999 | Turner et al. | 123/568.24 |
| 7,252,618 B2 | * | 8/2007 | Spakowski et al. | 475/343 |
| 8,474,789 B2 | * | 7/2013 | Shimada et al. | 251/129.04 |
| 8,490,605 B2 | * | 7/2013 | Gracner et al. | 123/568.11 |
| 2007/0256747 A1 | | 11/2007 | Morris | |
| 2009/0020717 A1 | | 1/2009 | Min | |
| 2012/0312107 A1 | * | 12/2012 | Lestienne et al. | 74/55 |
| 2013/0139503 A1 | * | 6/2013 | Eggler et al. | 60/602 |

FOREIGN PATENT DOCUMENTS

| | | |
|---|---|---|
| DE | 102007031429 A1 | 1/2009 |
| DE | 202009002291 U1 | 4/2009 |

OTHER PUBLICATIONS

English abstract for CN-201187584.

* cited by examiner

CONTROL DEVICE AND USE THEREOF

CROSS-REFERENCE TO RELATED APPLICATIONS

This application claims priority to German Patent Application 10 2009 053 829.1 filed on Nov. 18, 2009 and PCT/EP2010/067103 filed on Nov. 9, 2010, which are hereby incorporated by reference in their entireties.

TECHNICAL FIELD

The present invention relates to a control device for bidirectionally actuating a control member, in particular in a motor vehicle. The invention also relates to a use of such a control device. The invention further relates to an internal combustion engine, in particular in a motor vehicle, which is equipped with such a control device.

BACKGROUND

Control devices of this type can be used, for example, for internal combustion engines, in particular in motor vehicles. There, they are used, e.g., for actuating a wastegate of a turbine of an exhaust gas turbocharger or for actuating a variable geometry of an exhaust gas turbocharger. Furthermore, they can also be used for actuating an exhaust gas valve, or an exhaust gas recirculation valve, or a fresh air valve or for any other flap valve arrangement, in particular on the fresh air or exhaust gas side.

Typically, such a control device comprises a control drive and a coupling unit coupled on the drive side to the control drive for performing bidirectional control motions and designed for coupling on the output side to the control member to be actuated bidirectionally. The term "bidirectionally" comprises here linear motions as well as rotational motions, in each case in both directions, in particular to be able to displace the respective control member between two end positions. Advantageously, for this purpose, the coupling device can have a drive element on the drive side which is coupled to the control drive, while on the output side, it has an output element which can be coupled to the control member and which is coupled via a joint to the drive element in order to be able to transfer tensile and compression forces. Through this articulated connection between drive element and output element, tolerance-related position deviations between the linear control motion of the control drive and the linear control motion of the control member can be compensated. For example, such a joint can be designed as a ball joint having a ball head formed on the output element, wherein the ball head is mounted in a ball head bearing formed on the drive element and can be rotated in any desired direction.

SUMMARY

The present invention is concerned with the problem of providing an improved or at least different embodiment for a control device of the aforementioned kind and for an internal combustion engine equipped therewith and for an associated use thereof, wherein said embodiments are in particular characterized by a cost-effective producibility and/or by improved tolerance compensation.

This problem is solved according to the invention by the subject matters of the independent claims. Advantageous embodiments are subject matter of the dependent claims.

The invention is based on the general idea to design the joint in such a manner that it has two degrees of freedom, namely a first degree of freedom which allows pivot motions between the drive element and the output element about a transverse axis in the joint running transverse to the longitudinal axis, and a second degree of freedom which allows linear motions between the drive element and the output element in the joint running parallel to the transverse axis. Due to the pivotability of the joint, the output element can follow a predetermined kinematic of the control member. Due to the linear displaceability, a tolerance-related offset between the optimal alignment of the output element and the alignment of the drive element predetermined through the installation of the control device can be compensated.

According to an advantageous embodiment, the joint can be designed as a barrel head joint, the longitudinal barrel head axis of which is oriented transverse or parallel to the transverse axis. Such a barrel head joint can be implemented in a particularly cost-effective manner.

According to an advantageous refinement, the barrel head joint can have a barrel head which is formed on the output element or the drive element and which is mounted in a barrel head bearing formed at the output element or the output element to be pivotable about the transverse axis and displaceable in the transverse axis. In this manner, the two degrees of freedom can be implemented in a constructionally simple manner.

In a particularly cost-effective refinement, the drive element can have two half shells, each of which comprises one bearing half shell, the two which together form the barrel head bearing.

According to another embodiment, the drive element can have a cylindrical outer contour and can be bidirectionally displaceable in a bearing bush in the longitudinal axis of the drive element, and can be mounted to be rotatable about the longitudinal axis of the drive element. Due to the rotatability of the drive element about its longitudinal axis, the coupling between the control drive and control member is provided with a further degree of freedom, thereby simplifying tolerance compensation.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

BRIEF DESCRIPTION OF THE DRAWINGS

In the figures, schematically.

DETAILED DESCRIPTION

Figure 1:
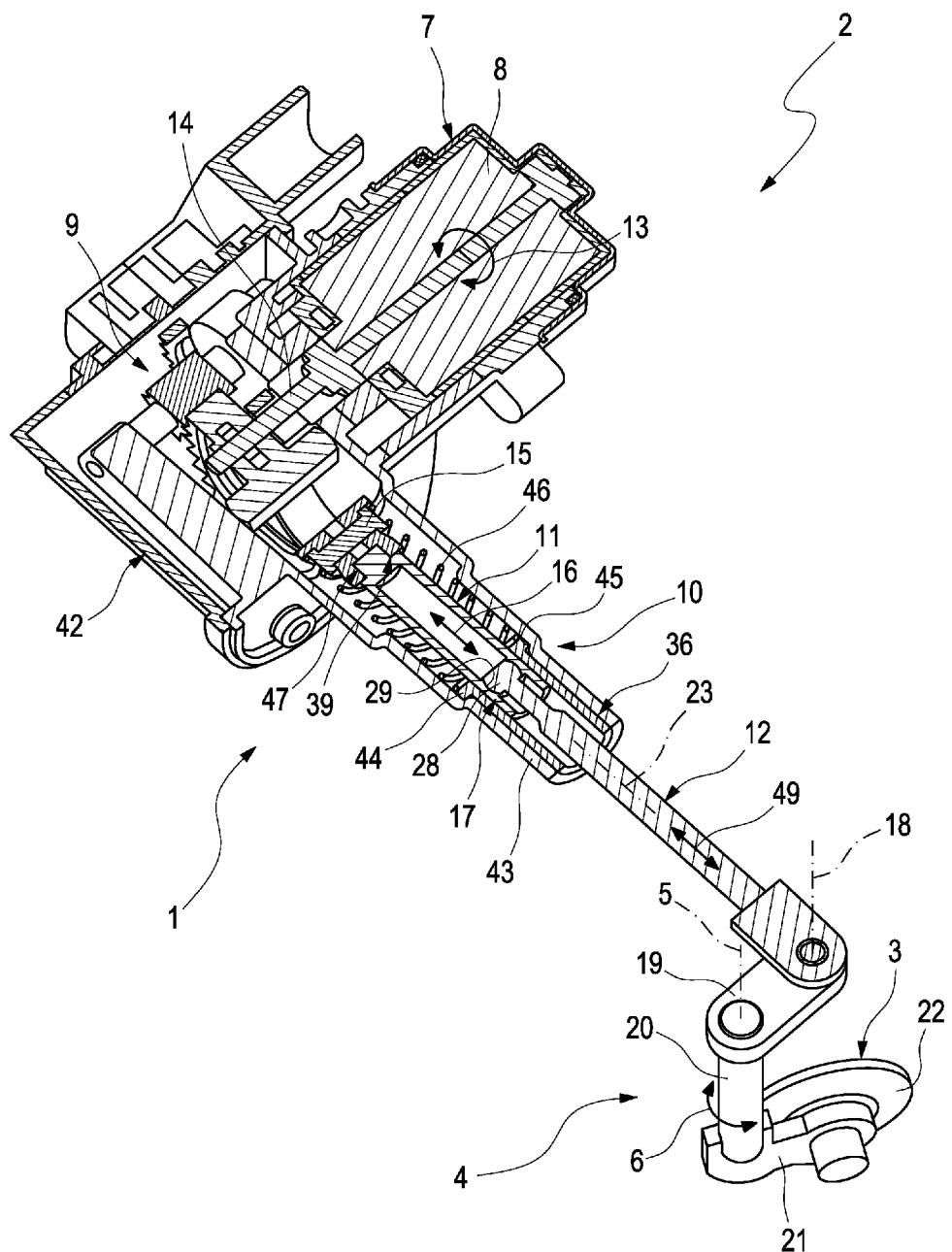
FIG. 1 shows a perspective partial sectional view of a control device.

According to FIG. 1, a motor vehicle 2 illustrated only in the region of a control device 1 can have a control member 3. The control member 3, for example, can be an integral part of a non-illustrated wastegate 4 of a turbine of an exhaust gas turbocharger. For example, the control member 3 is designed as a valve flap in order to control a bypass, namely the wastegate, bypassing the turbine. Likewise, the control member 3 can be an exhaust gas valve or a fresh air valve or an exhaust gas recirculation valve. In general, other flap valve arrangements, which can be arranged in particular on the fresh air side, are also conceivable as a control member 3. In another embodiment, the control member 3 can also be an integral part of a variable geometry of an exhaust gas turbocharger of the internal combustion engine 2. For example, by actuating the control member 3, guide vanes at the inlet of a turbine or the outlet of a turbocharger can be set with regard to their angle of attack.

Thus, the control device 1 serves for actuating the control member 3, wherein the control device 1 is designed for performing bidirectional motion processes. In the example, the control member 3 is arranged to be rotatable about a rotational axis 5. Thus, the bidirectional actuation of the control member 3 effects rotational motions corresponding to a rotational motion arrow 6 in opposite rotational directions. Linear displacement motions for a corresponding different control member 3 are also conceivable.

The control device 3 comprises a control drive 7 which, in the example, comprises a drive motor 8 and a transmission 9. The drive motor 8 is preferably designed as an electric motor. In principle, it can also be a hydraulic motor or a pneumatic motor.

Moreover, the control device 1 has a coupling unit 10. The latter is coupled on the drive side to the control drive 7 for performing bidirectional control motions. On the output side, the coupling unit 10 is designed for coupling to the control member 3 to be bidirectionally actuated. For this, the coupling unit 10 has a drive element 11 on the drive side and an output element 12 on the output side. The drive element 11 is coupled to the control drive 7. In the example, the drive element 11 is directly coupled to the transmission 9 and via the transmission 9, is indirectly coupled to the drive motor 8. The drive motor 8 generates a rotational motion 13 and transfers it via an output shaft 14 into the transmission 9. The transmission 9 is designed such that it converts an incoming rotational motion into a linear motion 16. Accordingly, the bidirectional rotational motion 13 generated by the drive motor 8 is transformed at an output member 15 on the output side of the transmission 9 into a bidirectional linear motion 16. This linear motion is transferred from the output member 15 to the drive element 11 and from there via a joint 17 to the output element 12. The bidirectional linear displacement of the output member 12 is designated with 49.

In the shown assembled state, the output element 12 is coupled to the control member 3. In the example, the output element 12 is mounted in an articulated manner on an actuating arm 19 to be pivotable about a pivot axis 18, wherein said actuating arm is non-rotatably connected to an actuating shaft 20 which is mounted to be movable about the aforementioned rotational axis 5 of the control member 3. Moreover, the shaft 20 is connected via a coupling arm 21 to the valve body 22 of the control member 3. Finally, the linear motion 17 of the output member 12 is transformed through the coupling shown here into the rotational motion 6 of the control member 3.

The output element 12 is coupled via the joint 17 to the drive element 11 for transferring tensile and compression forces, namely in each case in a longitudinal axis 23. In the example, this involves the longitudinal axis 23 of the output element 12. The output element 12 is rod-shaped, for example, and extends in the longitudinal axis 23.

Figure 3:
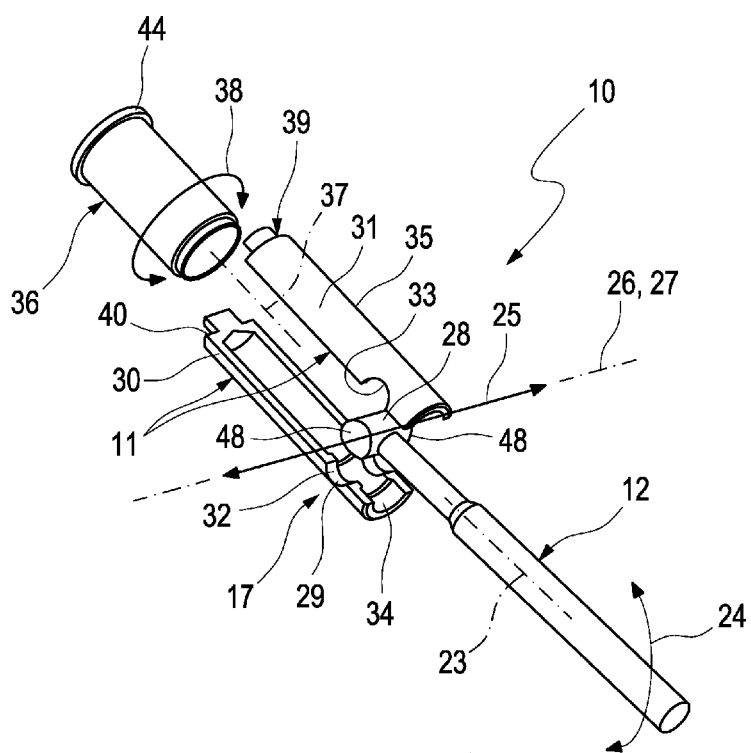
FIG. 3 shows a perspective view of the control device in the region of the coupling device in an exploded illustration.

The joint 17 is designed such that it allows, on the one hand, pivot motions 24 between the drive element 11 and the output element 12 as indicated in FIG. 3 and, on the other, linear motions 25, also illustrated in FIG. 3. The pivot motions 24 take place about a transverse axis 26 extending in the joint 17 transverse to the longitudinal axis 23, while the linear motions take place parallel to the transverse axis 26 and coaxial to the transverse axis 26. Accordingly, the double arrow representing the linear motions 25 in FIG. 3 lies on the transverse axis 26.

Figure 2:
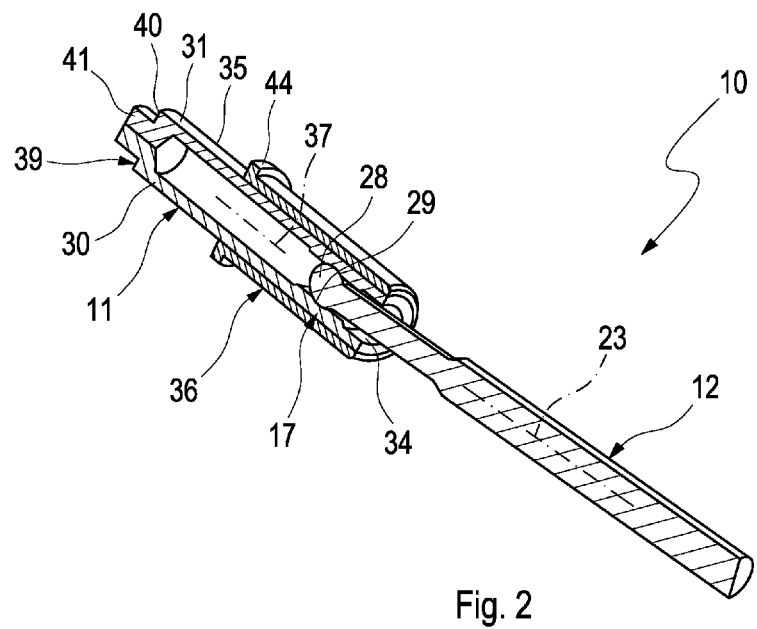
FIG. 2 shows a perspective sectional view of the control device in the region of the coupling device.

According to the FIGS. 1 to 3, the joint 17 is designed according to the preferred embodiment introduced here as a barrel head joint which is also designated with 17 hereinafter. The barrel head joint 17 has a longitudinal barrel head axis 27 which coincides with the transverse axis 26 or, respectively, is oriented coaxially to the transverse axis 26. The barrel head joint 17 has a barrel head 28 and a barrel head bearing 29. In the embodiment shown here, the barrel head 28 is formed on the output element 12, while the barrel head bearing 29 is formed on the drive element 11. Also conceivable is a reversed construction in which the barrel head 28 is formed on the drive element 11 while the barrel head bearing 29 is formed on the output element 12.

The barrel head 28 is mounted in the barrel head bearing 29 to be pivotable about the transverse axis 26 and is also mounted to be displaceable in the transverse axis 26 so that, on the one hand, the pivot motions 24 and, on the other, the linear motions 25 are possible.

In the shown preferred example, the drive element 11 has two half shells 30, 31, the two which together form the drive element 11. Each half shell 30, 31 has a bearing half shell 32, 33, the two which together form the barrel head bearing 29. In this respect, a parting plane in which the two half shells 30, 31 adjoin each other is selected such that the longitudinal barrel head axis 27 and the pivot axis 26, respectively, lie in said parting plane. In the case of coaxial alignment of drive element 11 and output element 12, the longitudinal axis 23 lies also in this plane.

The drive element 11 has a through opening 34. Said opening opens out in the barrel head bearing 29 and is oriented in the longitudinal direction 23. The output element 12 extends through the through opening 34 up to the barrel head 28 which is mounted in the barrel head bearing 29. The through opening 34 is dimensioned in such a manner that it allows, on the one hand, the pivot motions 24 and, on the other, the displacement motions 25 between drive element 11 and output element 12. In particular, an opening width of the through opening 34 is therefore larger than an outer cross-section of the output element 12 in the region penetrating the through opening 34. In the case of the shell construction of the drive element 11 shown here, in each case one half of the through opening 34 is formed in the two shells 30, 31.

In particular in the assembled state, the drive element 11 has a cylindrical outer contour 35 which is mounted in the cylindrical bearing bush 36. Here, on the one hand, the drive element 11 is mounted in the bearing bush 36 to be bidirectionally displaceable in its longitudinal axis 37. On the other hand, the drive element 11 is mounted in the bearing bush 36 to be rotatable about its longitudinal 37. A corresponding rotational displaceability is indicated in FIG. 3 by a double arrow and designated with 38. Thus, in the assembled state, the coupling unit 10 is given an additional degree of freedom, namely the rotatability 38 about the longitudinal axis 37 of the drive element 11.

In order to be able to implement this additional rotatability 38 of the entire coupling unit 10, the drive element 11 is rotatably coupled to the drive member 15 of the control drive 7 or the transmission 9, respectively. For this, the drive element 11 has an axial bearing 39 in its end remote from the output element 12. In particular, said distal end is designed as an axial bearing 39. The drive member 15 of the control drive 7 or the transmission 9 is supported in the longitudinal axis 37 of the drive element 11 on this axial bearing 39, wherein it is also rotatably supported about the longitudinal axis 37. For example, the axial bearing 39 comprises an annular step 40 formed on the drive element 11. In the shell construction introduced here, the two half shells 30, 31 have in each case half an annular step 40 and thus in each case half an axial bearing 39 and half a bearing pin 41. Furthermore, the axial bearing 39 comprises a central bearing pin 41 which extends coaxially to the longitudinal axis 37 of the drive element 11.

According to FIG. 1, the control device 1 comprises a housing 42 for receiving the control drive 7. Accordingly, the housing 42 receives the drive motor 8 and the transmission 9. Moreover, the housing 42 receives the coupling unit 10. In particular, the housing 42 has an output region 43 which connects to the output side of the transmission 9 and in which the drive element 11 is arranged in a bidirectionally displaceable manner and which receives the bearing bush 36. For example, in the displacement section 43 of the housing 42, the bearing bush 36 is supported via a collar 44 on a corresponding annular step 45 of the housing 42. Moreover, according to FIG. 1, a return spring 46 is accommodated in this displacement section 43, which return spring is supported on the one side at the bearing bush 36 via the collar 44 and is supported on the other side at the drive member 15 of the control drive 7 or the transmission 9. This means that the return spring 46 does not pretension the drive element 11 into a starting position, but the drive member 15. Therefore, a coupling 47, which also allows transferring tensile forces, is preferred for the axial bearing 39. For example, this coupling 47 can be designed as a clip connection which allows rotating about the longitudinal axis 37 of the drive element 11. This clip connection or coupling 47 can be implemented at the bearing pin 41 so that the coupling 47 and the axial bearing 39 form an integral unit.

The barrel head 28 can principally be manufactured separately from the output element 12. Accordingly, the barrel head 28 can be fastened in a suitable manner to the output element 12. Alternatively, an integral construction is also possible, wherein the barrel head 28 is integrally molded on the output element 12.

As materials from which the barrel head 28 and the barrel head bearing 29 are made, friction-optimized material pairs can be used which have in particular different abrasion resistances. Conceivable are, for example, the following material pairs, wherein in each case the first material is associated with the bearing shell 29 while the in each case second material is associated with the barrel head 28:

Stainless steel—stainless steel with Teflon coating,
stainless steel—brass or bronze,
metal with an anti—friction layer
plastic with a Teflon filling—plastic with a Teflon filling
metal—plastic
plastic—metal.

Since the barrel head bearing 29 is in particular integrally formed on the drive element 11, this results in a corresponding material selection for the respective drive element 11. The same applies to the output element 12 if the barrel head 28 is integrally formed thereon.

The barrel head 28 has two front sides 48 which face in opposite directions and which, according to a preferred embodiment, can be convexly curved outward with regard to the longitudinal axis 23 of the drive element 12.

The invention claimed is:

1. A control device for bidirectionally actuating a control member comprising:
    a control drive;
    a coupling unit coupled on a drive side to the control drive for performing bidirectional control motions and on an output side to the control member to be bidirectionally actuated,
    wherein the coupling unit has a drive element on the drive side coupled to the control drive,
    wherein the coupling unit has an output element on the output side coupled to the control member and to the drive element via a joint for transferring tensile and compression forces in a longitudinal axis of the output element,
    wherein the joint has at least two degrees of freedom, a first degree of freedom configured to allow pivot motions between the drive element and the output element about a transverse axis running in the joint transverse to the longitudinal axis, and a second degree of freedom configured to allow linear motions between the drive element and the output element in the joint running parallel to the transverse axis,
    wherein the drive element has an end opposite the output element, the end having an axial bearing for supporting a drive member of the control drive in a longitudinal axis of the drive element, the drive member configured to be rotatable about the longitudinal axis.

2. The control device according to claim 1, wherein the axial bearing has an annular step formed on the drive element.

3. The control device according to claim 1, wherein the control drive has a drive motor and a transmission.

4. The control device according to claim 1, wherein the control drive is arranged in a housing, the housing being mounted to the coupling in a displaceable manner.

5. The control device according to claim 1, wherein the control device is configured to actuate at least one of:
    a wastegate of a turbine of an exhaust gas turbocharger, and
    a variable geometry of an exhaust gas turbocharger, and
    an exhaust gas valve, and
    an exhaust gas recirculation valve, and
    a fresh air valve, and
    a flap valve arrangement.

6. The control device according to claim 1, wherein the drive element has a cylindrical outer contour and is bidirectionally displaced in a bearing bush in the longitudinal axis of the drive element so as to be rotatable about the longitudinal axis of the drive element.

7. The control device according to claim 6, wherein the drive element is coupled to the control drive so as to be rotatable about the longitudinal axis relative to the control drive.

8. The control device according to claim 1, wherein the joint is a barrel head joint having a longitudinal barrel head axis oriented coaxially to the transverse axis.

9. The control device according to claim 8, wherein the drive element has a cylindrical outer contour and is bidirectionally displaced in a bearing bush in the longitudinal axis of the drive element so as to be rotatable about the longitudinal axis of the drive element.

10. The control device according to claim 8, wherein the control drive has a drive motor and a transmission.

11. The control device according to claim 8, wherein the control drive is arranged in a housing, the housing being mounted to the coupling unit in a displaceable manner.

12. The control device according to claim 8, wherein the barrel head joint has a barrel head formed between the output element and the drive element and is mounted in a barrel head bearing formed on at least one of the drive element and the output element to be pivotable about the transverse axis and displaceable in the transverse axis.

13. The control device according to claim 12, wherein the barrel head is integrally molded on the drive element.

14. The control device according to claim 12, wherein the barrel head and the barrel head bearing are made from materials having different abrasion resistances.

15. The control device according to claim 12, wherein the barrel head has two front ends facing in opposite directions from one another, the respective front ends convexly curving outwards with respect to the longitudinal axis.

16. The control device according to claim 12, wherein the drive element has two half shells, each half shell including one bearing half shell which together form the barrel head bearing.

17. The control device according to claim 16, wherein the drive element defines a through opening oriented in the longitudinal direction and opening out into the barrel head bearing, the through opening configured to receive the output element extending from the barrel head in the longitudinal direction, further wherein the through opening is configured to allow the output element to be pivotable about the transverse axis and displaceable in the transverse axis.

18. A control device for bidirectionally actuating a control member, comprising:
 a control drive;
 a coupling unit coupled on a drive side to the control drive for performing bidirectional control motions and on an output side to the control member to be bidirectionally actuated;
 the coupling unit including a drive element on the drive side coupled to the control drive, wherein the drive element has a cylindrical outer contour and is bidirectionally displaced in a bearing bush in a longitudinal axis of the drive element so as to be rotatable about the longitudinal axis of the drive element;
 the coupling unit including an output element on the output side coupled to the control member and to the drive element via a joint for transferring tensile and compression forces in a longitudinal axis of the output element;
 wherein the joint includes at least two degrees of freedom, a first degree of freedom configured to allow pivot motions between the drive element and the output element about a transverse axis running in the joint transverse to the longitudinal axis of the output element, and a second degree of freedom configured to allow linear motions between the drive element and the output element in the joint running parallel to the transverse axis;
 wherein the joint is a barrel head joint having a longitudinal barrel head axis oriented coaxially to the transverse axis.

19. A control device for bidirectionally actuating a control member, comprising:
 a control drive;
 a coupling unit coupled on a drive side to the control drive for performing bidirectional control motions and on an output side to the control member to be bidirectionally actuated;
 the coupling unit including a drive element on the drive side coupled to the control drive,
 the coupling unit including an output element on the output side coupled to the control member and to the drive element via a joint for transferring tensile and compression forces in a longitudinal axis of the output element;
 wherein the joint includes at least two degrees of freedom, a first degree of freedom configured to allow pivot motions between the drive element and the output element about a transverse axis running in the joint transverse to the longitudinal axis, and a second degree of freedom configured to allow linear motions between the drive element and the output element in the joint running parallel to the transverse axis;
 wherein the joint is a barrel head joint having a longitudinal barrel head axis oriented coaxially to the transverse axis, the barrel head joint including a barrel head disposed between the output element and the drive element, the barrel head mounted in a barrel head bearing arranged on at least one of the drive element and the output element being pivotable about the transverse axis and displaceable in the transverse axis, wherein the barrel head has two front ends facing in opposite directions from one another, the two front ends convexly curving outwards with respect to the longitudinal axis.

20. A control device for bidirectionally actuating a control member, comprising:
 a control drive;
 a coupling unit coupled on a drive side to the control drive for performing bidirectional control motions and on an output side to the control member to be bidirectionally actuated,
 wherein the coupling unit has a drive element on the drive side coupled to the control drive, the drive element including an axial bearing on one end for supporting a drive member of the control drive in a longitudinal axis of the drive element, the drive member configured to be rotatable about the longitudinal axis;
 wherein the coupling unit has an output element on the output side coupled to the control member and to the drive element via a joint for transferring tensile and compression forces in a longitudinal axis of the output element,
 wherein the joint has at least two degrees of freedom, a first degree of freedom configured to allow pivot motions between the drive element and the output element about a transverse axis running in the joint transverse to the longitudinal axis of the output element, and a second degree of freedom configured to allow linear motions between the drive element and the output element in the joint running parallel to the transverse axis;
 wherein the joint is a barrel head joint having a longitudinal barrel head axis oriented coaxially to the transverse axis, the barrel head joint including a barrel head disposed between the output element and the drive element, the barrel head mounted in a barrel head bearing arranged on at least one of the drive element and the output element being pivotable about the transverse axis and displaceable in the transverse axis.

* * * * *